US012755974B2

(12) United States Patent
Wu et al.

(10) Patent No.: US 12,755,974 B2
(45) Date of Patent: Oct. 6, 2026

(54) POSITIVE ELECTRODE SLURRY, POSITIVE ELECTRODE PLATE, AND SECONDARY BATTERY AND BATTERY MODULE INCLUDING SUCH POSITIVE ELECTRODE PLATE

(71) Applicant: CONTEMPORARY AMPEREX TECHNOLOGY (HONG KONG) LIMITED, Hong Kong (CN)

(72) Inventors: Qifan Wu, Fujian (CN); Ming Zhang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 597 days.

(21) Appl. No.: 18/352,961

(22) Filed: Jul. 14, 2023

(65) Prior Publication Data

US 2023/0361303 A1 Nov. 9, 2023

Related U.S. Application Data

(63) Continuation of application No. PCT/CN2022/085524, filed on Apr. 7, 2022.

(51) Int. Cl.
*H01M 4/62* (2006.01)
*C09D 5/24* (2006.01)
(Continued)

(52) U.S. Cl.
CPC ................ *H01M 4/62* (2013.01); *C09D 5/24* (2013.01); *C09D 7/61* (2018.01); *C09D 171/02* (2013.01);
(Continued)

(58) Field of Classification Search
CPC ...... H01M 4/62; H01M 4/136; H01M 4/5825; H01M 2004/021; H01M 2004/028;
(Continued)

(56) References Cited

U.S. PATENT DOCUMENTS

2003/0158310 A1 8/2003 Asano et al.
2007/0287070 A1 12/2007 Okumura et al.
(Continued)

FOREIGN PATENT DOCUMENTS

CN 104115316 A 10/2014
CN 109585922 A 4/2019
(Continued)

OTHER PUBLICATIONS

Extended European Search Report for Application No. 22919272.9, mailed Dec. 12, 2024, 10 pages.
(Continued)

*Primary Examiner* — Daniel H Lee
(74) *Attorney, Agent, or Firm* — Ladas & Parry, LLP

(57) ABSTRACT

A positive electrode slurry containing polyether polyol, where the polyether polyol has the following constitutional formula:

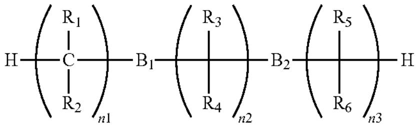

where n1, n2, n3, $R_1$, $R_2$, $R_3$, $R_4$, $R_5$, $R_6$, $B_1$, and $B_2$ are as defined in the specification are described. The addition of the polyether polyol described in this application can increase a
(Continued)

coating weight of positive electrode plates, thereby increasing energy density of batteries.

18 Claims, 2 Drawing Sheets

(51) Int. Cl.

| | |
|---|---|
| ***C09D 7/61*** | (2018.01) |
| ***C09D 171/02*** | (2006.01) |
| ***H01M 4/136*** | (2010.01) |
| ***H01M 4/58*** | (2010.01) |
| *C08K 3/04* | (2006.01) |
| *C08K 3/32* | (2006.01) |
| *H01M 4/02* | (2006.01) |

(52) U.S. Cl.
CPC ......... *H01M 4/136* (2013.01); *H01M 4/5825* (2013.01); *C08K 3/04* (2013.01); *C08K 2003/328* (2013.01); *C08K 2201/001* (2013.01); *H01M 2004/021* (2013.01); *H01M 2004/028* (2013.01)

(58) Field of Classification Search
CPC ............. H01M 4/0404; H01M 4/1397; H01M 10/0525; C09D 5/24; C09D 7/61; C09D 171/02; C08K 3/04; C08K 2003/328; C08K 2201/001; C08K 2003/321; C08K 2003/324; C08L 71/02; C08G 65/2609; Y02E 60/10
See application file for complete search history.

(56) References Cited

U.S. PATENT DOCUMENTS

| | | | | |
|---|---|---|---|---|
| 2015/0099167 | A1 | 4/2015 | Oshima et al. | |
| 2018/0233750 | A1* | 8/2018 | Aoki | C08F 220/04 |

FOREIGN PATENT DOCUMENTS

| | | | |
|---|---|---|---|
| CN | 110611117 | A | 12/2019 |
| CN | 111433248 | A | 7/2020 |
| JP | 2004055509 | A | 2/2004 |
| JP | 2004281055 | A | 10/2004 |
| WO | 2021146815 | A1 | 7/2021 |

OTHER PUBLICATIONS

ISR for International Application PCT/CN2022/085524 mailed Dec. 28, 2022.

Written Opinion for International Application PCT/CN2022/085524 mailed Dec. 28, 2022.

* cited by examiner

POSITIVE ELECTRODE SLURRY, POSITIVE ELECTRODE PLATE, AND SECONDARY BATTERY AND BATTERY MODULE INCLUDING SUCH POSITIVE ELECTRODE PLATE

CROSS-REFERENCE TO RELATED APPLICATIONS

This application is a continuation of International application PCT/CN2022/085524 filed on Apr. 7, 2022. The subjection of which is incorporated herein by reference in its entirety

TECHNICAL FIELD

This application relates to the field of lithium battery technologies, and in particular, to a positive electrode slurry and positive electrode plate containing polyether polyol. Furthermore, this application further relates to a secondary battery and battery module including such positive electrode plate.

BACKGROUND

In recent years, with increasingly wide use of lithium-ion batteries, lithium-ion batteries have been widely used in energy storage power supply systems such as hydroelectric, thermal, wind, and solar power plants, and many other fields including electric tools, electric bicycles, electric motorcycles, electric vehicles, military equipment, and aerospace. Along with the great development of lithium-ion batteries, higher requirements are imposed on improvement of their energy density and reduction of their costs.

Currently, one of the effective ways to improve the energy density of lithium-ion batteries is to increase the coating weight of positive electrode plates. However, increasing the coating weight of positive electrode plates leads to serious risks in the manufacture of electrode plates. Increasing the coating weight of positive electrode plates can also lead to difficulties in cell fabrication because the characteristics of positive electrode slurries and the characteristics of electrode plates directly affect cell fabrication.

Therefore, the positive electrode plates still need to be improved.

SUMMARY

In view of the foregoing issues, this application is intended to provide a positive electrode slurry containing specific polyether polyol, a positive electrode plate prepared using such positive electrode slurry, and a secondary battery and battery module including such positive electrode plate.

Accordingly, a first aspect of this application provides a positive electrode slurry including a positive electrode active substance and polyether polyol. The polyether polyol has the following constitutional formula:

formula 1

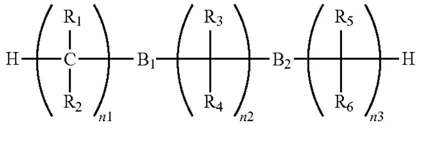

where n1, n2, and n3 are all integers, with a sum in the range of 1 to 10;

$B_1$ and $B_2$ are each independently selected from a straight bond and $—(CH_2)_{n4}—$, where n4 is an integer, and a sum of n4 and n1, n2, and n3 is in the range of 1 to 10;

$R_1$, $R_2$, $R_3$, $R_4$, $R_5$, and $R_6$ are each independently selected from H, hydroxyl, halogen, a $C_{2-10}$ alkyl group, a $C_{2-10}$ alkoxy group, and XM, where X is selected from —O—, —S—, and —NH—, and preferably —O—;

M has the following constitutional formula:

$$—(CH_2—CHR—O)_nD \quad \text{formula 2}$$

where n is an integer ranging from 2 to 2000, optionally from 10 to 2000, and most optionally from 20 to 1500; and D is H or a $C_{1-8}$ alkyl group;

each R is independently selected from H, halogen, hydroxyl, a halogenated $C_{1-8}$ alkyl group, $—R_7$, $—OR_7$, or $R_7OR_8$, where $R_7$ and $R_8$ are each independently selected from a straight-chain or branched-chain $C_{1-8}$ alkyl group, a phenyl group, a $C_{1-8}$ alkyl substituted phenyl group, a $C_{1-8}$ alkoxy substituted phenyl group, or a halogenated phenyl group; and optionally, each R is independently H, $R_7$, or a phenyl group; and at least one of $R_1$, $R_2$, $R_3$, $R_4$, $R_5$, and $R_6$ is XM.

In any embodiment of this application, after the polyether polyol is added to the positive electrode slurry, a resulting lithium-ion battery has a significantly increased energy density. In addition, due to the improvement of the positive electrode plate, the amount of material for fabricating a cell can be reduced, thus reducing the total material cost of the cell.

In any embodiment, in the constitutional formula of the polyether polyol, a sum of n1, n2, n3, and n4 is in the range of 2 to 6.

In any embodiment, the polyether polyol has a weight-average molecular weight ranging from 1000 to 80,000, optionally from 2000 to 70,000, and more optionally from 4000 to 60,000.

When the molecular weight is too small, the positive electrode slurry has poor stability, physical gelation is likely to occur, and a sheet resistance of the positive electrode deteriorates, which adversely affects the performance of the battery. When the molecular weight is too large, it is not conducive to dispersion of the polyether polyol in the positive electrode slurry. Therefore, the weight-average molecular weight of the polyether polyol needs to be controlled within the foregoing range.

Sufficient hydrogen bonds and an appropriate amount of covalent bonds are formed among the polyether polyol, positive electrode active substance, and current collector, ensuring the stability during preparation of the positive electrode plate, flexibility of the positive electrode plate, and dispersion of various positive electrode substances, thereby improving energy density of the battery.

In any embodiment, a weight ratio of the polyether polyol to the positive electrode active substance ranges from 0.0005 to 0.050, optionally from 0.001 to 0.02, more optionally from 0.001 to 0.01, and most optionally from 0.001 to 0.007.

When the ratio is too small, the positive electrode plate cracks at a high coating weight. When the ratio is too large, the performance of the battery is adversely affected.

In any embodiment, the positive electrode active substance is selected from at least one of lithium iron phosphate, lithium manganese iron phosphate, lithium manganese oxide, lithium cobalt oxide, lithium nickel cobalt manganese oxide, lithium nickel cobalt aluminate, lithium nickel oxide, or a mixture thereof.

When the positive electrode active substance is at least one of lithium iron phosphate, lithium manganese iron phosphate, lithium manganese oxide, lithium cobalt oxide, lithium nickel cobalt manganese oxide, lithium nickel cobalt aluminate, lithium nickel oxide, or a mixture thereof, the addition of the polyether polyol can further improve the flexibility and maximum coating weight of the electrode plate.

In any embodiment, a gel state factor G of the positive electrode slurry ranges from 0 to 1, and optionally from 0 to 0.3;

where $G=(m1-2)/m1$, the slurry is determined to be not gelled when G ranges from 0 to 0.3, and the slurry is determined to be gelled when G is greater than 0.3;

m1 is a mass of a positive electrode slurry obtained after 2 kg of an initial positive electrode slurry is filtered for 10 minutes using a 100-mesh filter; and m2 is a mass of a positive electrode slurry obtained after 2 kg of a positive electrode slurry that has been left standing for 48 hours is filtered for 10 minutes using a 100-mesh filter; where the positive electrode slurry used in the determination of m1 and the positive electrode slurry used in the determination of m2 are from the same batch of positive electrode slurry.

A more similar mass of the positive electrode slurry obtained by filtration after 48 h standing to the mass initially obtained and a smaller G value indicate that the slurry is less prone to gelation and has a better state. The anti-gelation performance of the positive electrode slurry described in this application is excellent.

A second aspect of this application provides a positive electrode plate including:

a positive electrode current collector; and a positive electrode film layer on at least one surface of the positive electrode current collector, where the positive electrode film layer includes the positive electrode slurry according to the first aspect of this application. As mentioned above, with the polyether polyol added, this application allows for an increased maximum coating weight of the positive electrode plate, which is also manifested in an increase in the maximum weight of the positive electrode film layer.

In any embodiment, a mass of the positive electrode film layer per unit area of the electrode plate ranges from 13 $mg/cm^2$ to 31 $mg/cm^2$, optionally from 22 $mg/cm^2$ to 31 $mg/cm^2$, and more optionally from 22 $mg/cm^2$ to 29 $mg/cm^2$, and the mass is a mass of the positive electrode film layer on a single surface of the electrode plate. If the positive electrode plate is provided with the positive electrode film layer on two surfaces, a mass of the positive electrode film layer per unit area of the electrode plate is twice the foregoing range, to be specific, ranging from 26 $mg/cm^2$ to 62 $mg/cm^2$, optionally from 44 $mg/cm^2$ to 62 $mg/cm^2$, and more optionally from 44 $mg/cm^2$ to 58 $mg/cm^2$, and the mass is a mass of the positive electrode film layer on the two surfaces of the electrode plate.

When the weight of the positive electrode film layer per unit area of the electrode plate is too small, the electrode plate has undesirable uniformity; and when the weight of the positive electrode film layer per unit area of the electrode plate is too large, severe cracking occurs in the electrode plate coating process and the fabrication has to be interrupted. In this application, the weight of the positive electrode film layer per unit area of the electrode plate is limited within the foregoing range so as to ensure that the best effect can be achieved within this range.

The positive electrode plate described in this application has good flexibility and a significantly increased coating weight. Application of such positive electrode plate to a secondary battery, for example, adding it directly to the positive electrode slurry during preparation, can significantly improve the energy density of the battery.

In any embodiment, under the condition that flexibility of the positive electrode plate is measured using a winding mandrel in this application, when a diameter R of the winding mandrel is less than or equal to 3.0 mm, the positive electrode plate has no cracks produced; or when a diameter R of the winding mandrel is equal to 3.0 mm, the positive electrode plate has cracks produced, but when the diameter R of the winding mandrel is equal to 4.0 mm, the positive electrode plate has no cracks produced.

With the polyether polyol described in this application added, the cold pressing pressure can be reduced, thereby reducing cracks and the risk of strip breakage, and further improving the flexibility of the electrode plate.

In any embodiment, the positive electrode plate has an infiltration increase rate I ranging from 2% to 20%, and optionally from 6% to 15%, where $I=(I2-I1)/I1\times100\%$, I2 is an infiltration rate of the positive electrode plate in an electrolyte; and I1 is an infiltration rate of a positive electrode plate containing no polyether polyol in an electrolyte;

where the positive electrode plate used in the determination of I1 is the same as the positive electrode plate used in the determination of I2, differing only in that the positive electrode plate used in the determination of I1 contains no polyether polyol and the positive electrode plate used in the determination of I2 contains the polyether polyol.

The electrode plate with high infiltrability can realize good infiltration in the electrolyte and electrolyte retention, thus realizing effective infiltration into the electrode plate of the cell, avoiding inadequate infiltration into the electrode plate, improving the efficiency of electrolyte injection of the cell and the infiltration into the electrode plate during the cycling, and thus effectively improving the performance of battery products. The positive electrode plate described in this application has quite high infiltrability in the electrolyte.

A third aspect of this application provides a secondary battery including the positive electrode plate according to the second aspect of this application or a positive electrode plate obtained from the positive electrode slurry according to the first aspect of this application.

A fourth aspect of this application provides a battery module including the secondary battery according to the third aspect of this application.

A fifth aspect of this application provides a battery pack including the battery module according to the fourth aspect of this application.

A sixth aspect of this application provides an electric apparatus including at least one of the secondary battery according to the third aspect of this application, the battery module according to the fourth aspect of this application, or the battery pack according to the fifth aspect of this application.

DESCRIPTION

Figure 1:
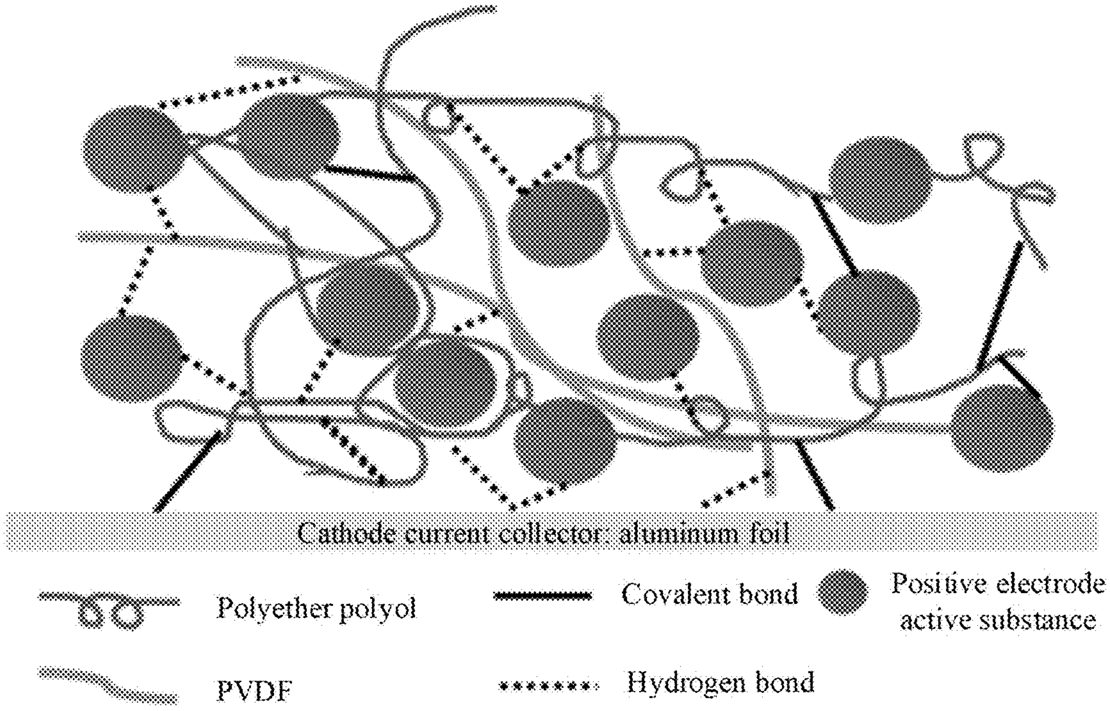
FIG. 1 is a schematic principle diagram of interaction between polyether polyol in a positive electrode plate of this application and other substances in the positive electrode plate, where the polyether polyol is the polyether polyol described in this application, a cathode current collector is a positive electrode current collector aluminum foil, and PVDF is a binder.

The following specifically discloses embodiments of a negative electrode plate and a manufacturing method thereof, a positive electrode plate, a secondary battery, a battery module, a battery pack, and an electrical apparatus in this application with appropriate reference to detailed descriptions of accompanying drawings. However, there may be cases where unnecessary detailed descriptions are omitted. For example, detailed descriptions of a well-known matter and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject matter recorded in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-6. In this application, unless otherwise stated, a value range of "a—b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions Unless otherwise specified, all the steps in this application can be performed in the order described or in random order, and optionally, in the order described. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are inclusive or may be exclusive. For example, the terms "include" and "contain" can mean that other unlisted components may also be included or contained, or only listed components are included or contained.

Unless otherwise specified, in this application, the term "or" is inclusive. For example, the phrase "A or B" means "A, B, or both A and B". More specifically, any one of the following conditions satisfies the condition "A or B": A is true (or present) and B is false (or not present); A is false (or not present) and B is true (or present); or both A and B are true (or present).

Figure 2:
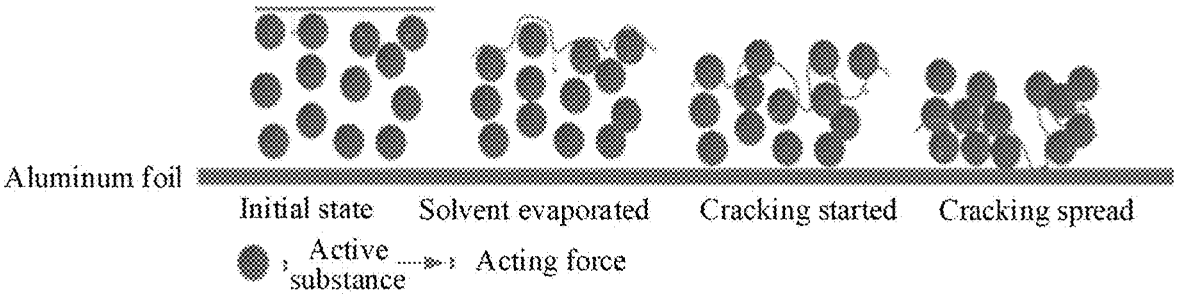
FIG. 2 is a schematic diagram of a process of coating cracking caused by capillary tension in a coating process of a positive electrode plate in the prior art. In the figure, the active substance is a positive electrode active substance, the force is a force generated in the coating process, and the arrows represent directions of acting forces. In the coating process, the polyether polyol described in this application is not used.

For lithium-ion batteries, increasing energy density is the trend. One of the ways to improve energy density is to increase the coating weight of positive electrode plates. However, the inventors of this application have found that, as shown in FIG. 2, in the conventional coating process of positive electrode slurry, a positive electrode plate cracks due to capillary tension during or after solvent evaporation, and the cracking spreads further, resulting in large-area cracking. In addition, this process is accompanied by curling of the edge of the electrode plate. In addition, because the positive electrode plate is hard and brittle, it suffers from strip breakage in a cold pressing process and severe fracture at the inner ring in a winding process. In view of this, the inventors of this application have designed and synthesized a flexible polymer material: polyether polyol. Such flexible material is added to increase the coating weight, improve the coating quality, eliminate the risks caused in the cold pressing and winding processes, and reduce the total cost of materials used to fabricate a battery.

Accordingly, a first aspect of this application provides a positive electrode slurry including a positive electrode active substance and polyether polyol. The polyether polyol has the following constitutional formula:

formula 1

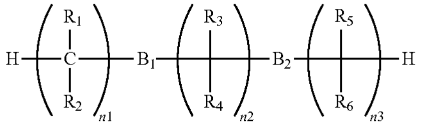

where n1, n2, and n3 are all integers, with a sum in the range of 1 to 10;

$B_1$ and $B_2$ are each independently selected from a straight bond and $—(CH_2)_{n4}—$, where n4 is an integer, and a sum of n4 and n1, n2, and n3 is in the range of 1 to 10;

$R_1$, $R_2$, $R_3$, $R_4$, $R_5$, and $R_6$ are each independently selected from H, hydroxyl, halogen, a $C_{2-10}$ alkyl group, a $C_{2-10}$ alkoxy group, and XM, where X is selected from —O—, —S—, and —NH—, and preferably —O—;

M has the following constitutional formula:

$$—(CH_2—CHR—O)_nD \quad \text{formula 2}$$

where n is an integer ranging from 2 to 2000, optionally from 10 to 2000, and most optionally from 20 to 1500; and D is H or a $C_{1-8}$ alkyl group;

each R is independently selected from H, halogen, hydroxyl, a halogenated $C_{1-8}$ alkyl group, $—R_7$, $—OR_7$, or $R_7OR_8$, where $R_7$ and $R_8$ are each independently selected from a straight-chain or branched-chain $C_{1-8}$ alkyl group, a phenyl group, a $C_{1-8}$ alkyl substituted phenyl group, a $C_{1-8}$ alkoxy substituted phenyl group, or a halogenated phenyl group; and optionally, each R is independently H, $R_7$, or a phenyl group; and at least one of $R_1$, $R_2$, $R_3$, $R_4$, $R_5$, and $R_6$ is XM.

Optionally, n1, n2, and n3 may each independently be an integer of 0, 1, 2, 3, 4, 5, 6, 7, 8, 9, or 10; and n4 may be an integer of 0, 1, 2, 3, 4, 5, 6, 7, 8, or 9.

Halogen denotes fluorine, chlorine, bromine, or iodine, and preferably fluorine.

In this application, the $C_{1-8}$ alkyl group is a straight-chain or branched-chain alkyl group containing 1-8 carbons, and the straight-chain or branched-chain alkyl group containing 1-8 carbons may be selected from, for example, methyl, ethyl, propyl, butyl, pentyl, hexyl, heptyl, octyl, isopropyl, isobutyl, tert-butyl, isopentyl, tert-pentyl, neopentyl, 2-methylpentyl, 3-methylpentyl, 2,2-dimethylbutyl, 2,3-dimethyl butyl, 2-methylhexyl, 3-methylhexyl, 2,2-dimethylpentyl, 3,3 -dimethylpentyl, 2,3-dimethylpentyl, 2,4-dimethylpentyl, 3-ethylpentyl, 2,2,3-trimethylbutyl, 2-methylheptyl, 3-methylheptyl, 4-methylheptyl, 2,2-dimethylhexane, 3,3-dimethylhexane, 2,3-dimethylhexane, 2,4-dimethylhexane, 2,5-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethyl-pentane, 3-methyl-3-ethyl-pentane, and 2,2,3,3-tetramethylbutane.

In this application, the $C_{2-10}$ alkyl group is a straight-chain or branched-chain alkyl group containing 2 to 10 carbons; and the $C_{2-10}$ alkoxy group is a straight-chain or branched-chain alkoxy group containing 2 to 10 carbons.

In this application, the alkyl in the halogenated $C_{1-8}$ alkyl group is optionally selected from methyl, ethyl, propyl, butyl, pentyl, hexyl, heptyl, octyl, isopropyl, isobutyl, tert-butyl, isopentyl, tert-pentyl, neopentyl, 2-methylpentyl, 3-methylpentyl, 2,2-dimethylbutyl, 2,3-dimethyl butyl, 2-methylhexyl, 3-methylhexyl, 2,2-dimethylpentyl, 3,3-dimethylpentyl, 2,3-dimethylpentyl, 2,4-dimethylpentyl, 3-ethylpentyl, 2,2,3-trimethylbutyl, 2-methylheptyl, 3-methylheptyl, 4-methylheptyl, 2,2-dimethylhexane, 3,3-dimethylhexane, 2,3-dimethylhexane, 2,4-dimethylhexane, 2,5-dimethylhexane, 3,4-dimethylhexane, 3-ethylhexane, 2,2,3-trimethylpentane, 2,2,4-trimethylpentane, 2,3,3-trimethylpentane, 2,3,4-trimethylpentane, 2-methyl-3-ethyl-pentane, 3-methyl-3-ethyl-pentane, and 2,2,3,3-tetramethylbutane. The halogen in the halogenated $C_{1-8}$ alkyl group may be selected from fluorine, chlorine, bromine, and iodine.

In this application, the $C_{1-8}$ alkyl substituted phenyl group is a phenyl group substituted with the $C_{1-8}$ alkyl group. The $C_{1-8}$ alkoxy substituted phenyl group is a phenyl group substituted with the $C_{1-8}$ alkoxy group.

In this application, the halogenated phenyl group represents a phenyl group substituted with halogens. In this application, the halogen may be selected from fluorine, chlorine, bromine, and iodine. In some embodiments, the halogenated phenyl group may be selected from, for example, 4-fluorophenyl, 2-fluorophenyl, 2,6-difluorophenyl, 4-(trifluoromethyl)phenyl, 4-chlorophenyl, 3-chlorophenyl, 4-bromophenyl, 3-bromophenyl, or 2-bromophenyl.

The substitution in the $C_{1-8}$ alkyl substituted phenyl group, halogenated phenyl group, $C_{1-8}$ alkoxy substituted phenyl group, halogenated $C_{1-8}$ alkyl group, and the like described in this application is mono-substitution or multi-substitution. Multi-substitution means substitution with more than one substituent group, and the substituent groups may be the same or different.

Figure 3:
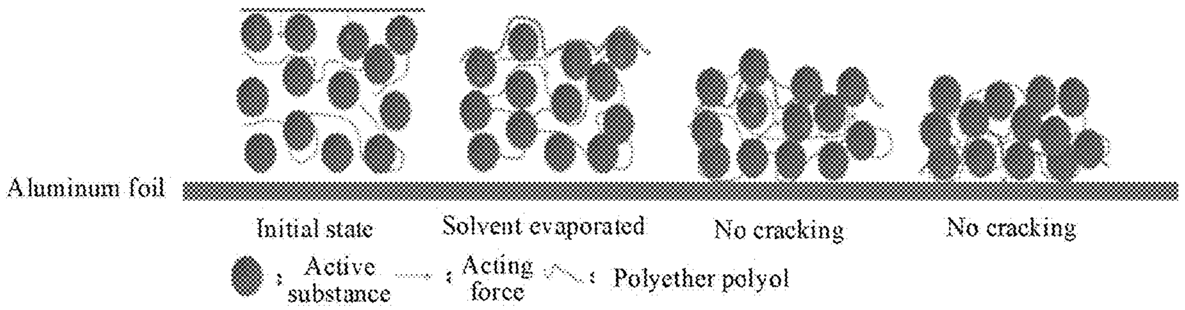
FIG. 3 is a schematic diagram of a positive electrode plate according to this application without cracking in a coating process. In the figure, the active substance is a positive electrode active substance, the force is a force generated in the coating process, and the arrows represent directions of acting forces. The polyether polyol described in this application is used.
Figure 4:
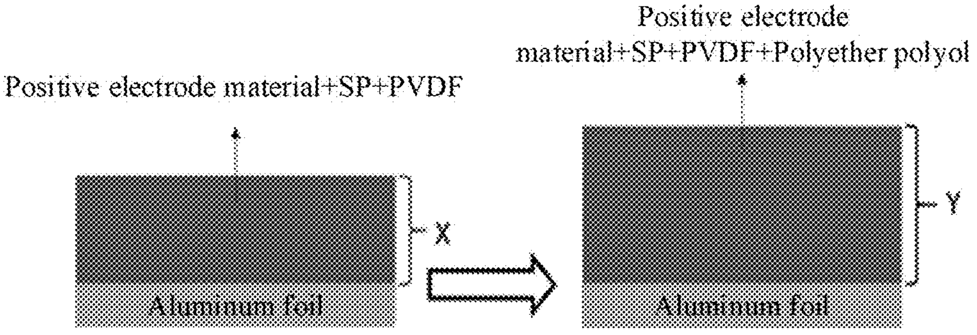
FIG. 4 is a schematic diagram showing an increase in a maximum coating weight per unit area of a positive electrode plate using polyether polyol in this application. In the figure, the positive material represents a positive electrode active substance material, SP represents a conductive agent used in the positive electrode plate, PVDF represents a binder used in the positive electrode plate, X represents a maximum coating thickness of the positive electrode slurry containing no polyether polyol, and Y represents a maximum coating thickness of the positive electrode slurry containing polyether polyol under the same condition. Apparently, Y is greater than X.

The polyether polyol described in this application contains flexible main chains and branched chains, which can disperse in the positive electrode slurry and also ensure the flexibility of the electrode plate. Hydrogen bonds or covalent bonds are formed between the polymers and between the polymer and surfaces of the positive electrode particles, ensuring that the positive electrode particles do not migrate in the coating process, as shown in FIG. 1. The polyether polyol has good compatibility with the electrolyte solvent, and does not affect the infiltration of the electrolyte into the surface of the positive electrode particles, ensuring its compatibility. In the cold pressing process, the flexible chains stretch, which can decrease the cold pressing pressure and reduce cracks and the risk of strip breakage. The polyether polyol of this application is of long flexible chains. Therefore, the addition of a flexible additive, that is, the polyether polyol described in this application, to the positive electrode slurry can improve the stability of the positive electrode slurry, improve the flexibility of the positive electrode plate, and ensure the dispersion of substances in the positive electrode plate, thereby increasing the coating weight of the positive electrode plate. As shown in FIG. 3, with the polyether polyol added, the positive electrode slurry of this application does not crack in the whole coating process. As shown in FIG. 4, the maximum coating thickness (weight) of the positive electrode plate is significantly increased after the polyether polyol of this application is added.

The polyether polyol described in this application may be obtained according to conventional technical means in the art or may be prepared according to the following steps:

adding a catalyst, a regulator, an initiator, and an epoxy compound to an autoclave for reacting at 20° C. to 200° C. at a pressure of −0.1 MPa to 0.5 MPa for 1 h to 30 h to obtain crude polyether polyol, which is then neutralized, degassed, adsorbed, and vacuum filtered to obtain finished polyether polyol. The catalyst may be one of KOH or NaOH, and the regulator may be one of ethylene glycol or glycerol, the acid used for the neutralization is sulfuric acid or phosphoric acid, and the initiator is preferably one or more of propylene glycol, ethylene glycol, diethylene glycol, dipropylene glycol, glycerin, trimethylolpropane, pentaerythritol, dipentaerythritol, xylitol, sorbitol, and mannitol. The epoxy compound is preferably one or more of ethylene oxide, propylene oxide, epichlorohydrin, cyclohexane oxide, cyclobutoxane, tetrahydrofuran, 4-vinyl cyclohexane oxide, allyl glycidyl ether, styrene oxide, 1,2-epoxypentane, 1,2-epoxyheptane, 1,2-epoxyoctane, 1,2-epoxydecane, 1,2-epoxy-3-methylbutane, cyclo oxyfluoropropane, epichlorohydrin, epibromohydrin alkyl substituted styrene oxide, bisphenol A epoxy resin, phenol type phenolic resin, bisphenol S epoxy resin, 1,4-butanediol dishrink glyceryl ether, polypropylene glycol diglycidyl ether, polyethylene glycol diglycidyl ether, glycerol triglycidyl ether, trimethylolpropane triglycidyl ether, pentaerythritol tetraglycidyl ether, or epoxidized animal and vegetable oils.

The weight-average molecular weight of the polyether polyol can be controlled by the reaction time, the amount of catalyst, the amount of regulator, the amount of initiator, and the like.

In any embodiment of this application, after the polyether polyol is added to the positive electrode slurry, a resulting lithium-ion battery has a significantly increased energy density. In addition, due to the improvement of the positive electrode plate, the amount of material for fabricating a cell can be reduced, thus reducing the total material cost of the cell.

In some embodiments, in the constitutional formula of the polyether polyol, a sum of n1, n2, n3, and n4 is in the range of 2 to 6.

In some embodiments, the polyether polyol has a weight-average molecular weight ranging from 1000 to 80,000, optionally from 2000 to 70,000, and more optionally from 4000 to 60,000.

The molecular weight has an influence on the processability of the positive electrode plate. In a case of small molecular weight, the flexibility of the positive electrode plate is not significantly improved, cracking still occurs in the coating process, and problems of strip breakage in cold pressing and fracture in winding may occur. When the molecular weight is too small, the positive electrode slurry has poor stability, physical gelation is likely to occur, and a sheet resistance of the positive electrode deteriorates, which adversely affects the performance of the battery. When the molecular weight is too large, it is not conducive to dispersion of the polyether polyol in the positive electrode slurry. Therefore, the weight-average molecular weight of the polyether polyol needs to be controlled within the foregoing range. In this application, the weight-average molecular weight of the polyether polyol can be measured using gel permeation chromatography.

In some embodiments, a weight ratio of the polyether polyol to the positive electrode active substance ranges from 0.0005 to 0.050, optionally from 0.001 to 0.02, more optionally from 0.001 to 0.01, and most optionally from 0.001 to 0.007.

The weight ratio of the polyether polyol to the positive electrode active substance ranges from 0.0005 to 0.050. When the ratio is too small, the positive electrode plate cracks at a high coating weight. When the ratio is too large, the performance of the battery is adversely affected.

In some embodiments, the positive electrode active substance is selected from at least one of lithium iron phosphate, lithium manganese iron phosphate, lithium manganese oxide, lithium cobalt oxide, lithium nickel cobalt manganese oxide, lithium nickel cobalt aluminate, lithium nickel oxide, or a mixture thereof.

Theoretically, for the positive electrode of the secondary battery, any positive electrode active material for batteries well-known in the art can be used in this application. For example, the positive electrode active material may include at least one of the following materials: olivine-structured lithium-containing phosphate, lithium transition metal oxide, and respective modified compounds thereof. However, this application is not limited to such materials, and may alternatively use other conventional well-known materials that can be used as positive electrode active materials for batteries. One of these positive electrode active materials may be used alone, or two or more of them may be used in combination. Examples of the lithium transition metal oxide may include but are not limited to at least one of lithium cobalt oxide (for example, $LiCoO_2$), lithium nickel oxide (for example, $LiNiO_2$), lithium manganese oxide (for example, $LiMnO_2$ and $LiMn_2O_4$), lithium nickel cobalt oxide, lithium manganese cobalt oxide, lithium nickel manganese oxide, lithium nickel cobalt manganese oxide (for example, $LiNi_{1/3}Co_{1/3}Mn_{1/3}O_2$ ($NCM_{333}$ for short), $LiNi_{0.5}Co_{0.2}Mn_{0.3}O_2$ ($NCM_{523}$ for short), $LiNi_{0.5}Co_{0.25}Mn_{0.25}O_2$ ($NCM_{211}$ for short), $LiNi_{0.6}Co_{0.2}Mn_{0.2}O_2$ ($NCM_{622}$ for short), and $LiNi_{10.8}Co_{0.1}Mn_{0.1}O_2$ ($NCM_{811}$ for short)), lithium nickel cobalt aluminum oxide (for example, $LiNi_{0.85}Co_{0.15}Al_{0.05}O_2$), and modified compounds thereof. Examples of the olivine-structured lithium-containing phosphate may include but are not limited to at least one of lithium iron phosphate (for example, $LiFePO_4$ (LFP for short)), a composite material of lithium iron phosphate and carbon, lithium manganese phosphate (for example, $LiMnPO_4$), composite materials of lithium manganese phosphate and carbon, lithium manganese iron phosphate, and composite materials of lithium manganese iron phosphate and carbon.

However, the inventors of this application have found that when the positive electrode active substance is at least one of lithium iron phosphate, lithium manganese iron phosphate, lithium manganese oxide, lithium cobalt oxide, lithium nickel cobalt manganese oxide, lithium nickel cobalt aluminate, lithium nickel oxide, or a mixture thereof, the addition of the polyether polyol can further improve the flexibility and maximum coating weight of the electrode plate.

In some embodiments, a gel state factor G of the positive electrode slurry ranges from 0 to 1, and optionally from 0 to 0.3, where $G=(m1-m2)/m1$, the slurry is determined to be not gelled when G ranges from 0 to 0.3, and the slurry is determined to be gelled when G is greater than 0.3;

m1is a mass of a positive electrode slurry obtained after 2 kg of an initial positive electrode slurry is filtered for 10 minutes using a 100-mesh filter; and m2 is a mass of a positive electrode slurry obtained after 2 kg of a positive electrode slurry that has been left standing for 48 hours is filtered for 10 minutes using a 100-mesh filter; where the positive electrode slurry used in the determination of m1 and the positive electrode slurry used in the determination of m2 are from the same batch of positive electrode slurry.

A more similar mass of the positive electrode slurry obtained by filtration after 48 h standing to the mass initially obtained and a smaller G value indicate that the slurry is less prone to gelation and has a better state. The anti-gelation performance of the positive electrode slurry described in this application is excellent.

A second aspect of this application provides a positive electrode plate including:

a positive electrode current collector; and a positive electrode film layer on at least one surface of the positive electrode current collector, where the positive electrode film layer includes the positive electrode slurry according to the first aspect of this application. As mentioned above, with the polyether polyol added, this application allows for an increased maximum coating weight of the positive electrode plate, which is also manifested in an increase in the maximum weight of the positive electrode film layer. In some embodiments, a mass of the positive electrode film layer per unit area of the electrode plate ranges from 13 $mg/cm^2$ to 31 $mg/cm^2$, optionally from 22 $mg/cm^2$ to 31 $mg/cm^2$, and more optionally from 22 $mg/cm^2$ to 29 $mg/cm^2$, and the mass is a mass of the positive electrode film layer on a single surface of the electrode plate. If the positive electrode plate is provided with the positive electrode film layer on two surfaces, a mass of the positive electrode film layer per unit area of the electrode plate is twice the foregoing range, to be specific, ranging from 26 $mg/cm^2$ to 62 $mg/cm^2$, optionally from 44 $mg/cm^2$ to 62 $mg/cm^2$, and more optionally from 44 $mg/cm^2$ to 58 $mg/cm^2$, and the mass is a mass of the positive electrode film layer on the two surfaces of the electrode plate.

In some embodiments, after the polyether polyol described in this application is added, the maximum coating weight per unit area on the positive electrode plate is up to 31 $mg/cm^2$, and optionally, the maximum coating weight per unit area on the positive electrode plate ranges from 23 $mg/cm^2$ to 31 $mg/cm^2$.

When the weight of the positive electrode film layer per unit area of the electrode plate is too small, the electrode plate has undesirable uniformity; and when the weight of the positive electrode film layer per unit area of the electrode plate is too large, severe cracking occurs in the electrode plate coating process and the fabrication has to be interrupted. In this application, the weight of the positive electrode film layer per unit area of the electrode plate is limited within the foregoing range so as to ensure that the best effect can be achieved within this range.

The positive electrode current collector includes two opposite surfaces in its thickness direction, and the positive electrode film layer is disposed on either or both of the two opposite surfaces of the positive electrode current collector.

In some embodiments, the positive electrode current collector may be a metal foil current collector or a composite current collector. For example, an aluminum foil may be used as the metal foil. The composite current collector may include a polymer material matrix and a metal layer formed on at least one surface of the polymer material matrix. The composite current collector may be formed by forming a metal material (aluminum, aluminum alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In the positive electrode plate, a mass percentage of the positive electrode active substance in the positive electrode film layer ranges from 90% to 97% based on the mass of the positive electrode film layer. Such percentage can be measured using an X-ray energy dispersive spectrometry (EDS) or inductively coupled plasma spectrometry (ICP). When the mass percentage is too low, the energy density of the battery prepared is too low to meet the battery capacity requirements; and when the mass percentage is too high, the binder and the conductive agent are insufficient, resulting in poor battery performance.

In the positive electrode plate, a mass percentage of the binder in the positive electrode film layer ranges from 2% to 5% based on the total mass of the positive electrode film layer. For example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, or fluorine-containing acrylic resin. Existing conventional positive electrode plates in which a binder of a specific crystallinity or similar crystallinity is used are brittle after undergoing coating and drying to form a film, and the electrode plates easily crack under stress. However, the positive electrode plate of this application using the binder of the same crystallinity does not crack.

In some embodiments, the positive electrode film layer further optionally includes a conductive agent. For example, the conductive agent may include at least one of superconducting carbon, acetylene black, carbon black, Ketjen black, carbon dots, carbon nanotubes, graphene, and carbon nanofiber.

In some embodiments, the positive electrode plate may be prepared in the following manner: the foregoing constituents used for preparing the positive electrode plate, for example, the positive electrode active substance, the conductive agent, the binder, and any other constituent, are dispersed in a solvent (for example, N-methylpyrrolidone) to form a positive electrode slurry; and the positive electrode slurry is applied onto the positive electrode current collector, followed by processes such as drying and cold pressing to obtain the positive electrode plate.

The positive electrode plate described in this application has good flexibility and a significantly increased coating weight. Application of such positive electrode plate to a secondary battery, for example, adding it directly to the positive electrode slurry during preparation, can significantly improve the energy density of the battery.

In some optional embodiments, the positive electrode film layer may include two sublayers. The sublayers are parallel to the positive electrode current collector and stacked. A ratio of a mass percentage of the polyether polyol in the sublayer closer to the positive electrode current collector (that is, the sublayer close to the current collector) to a mass percentage of the polyether polyol in the sublayer farther from the positive electrode current collector (that is, the sublayer far from the current collector) ranges from 0 to 60, and optionally from 0 to 40. In some optional embodiments, in the sublayer close to the current collector, the weight ratio of the polyether polyol to the positive electrode active substance ranges from 0 to 0.043; and in the sublayer away from the current collector, the weight ratio of the polyether polyol to the positive electrode active substance ranges from 0.0006 to 0.004.

Under the condition that the coating weight is 23 $mg/cm^2$ or above, as compared with single thick coating, multiple coatings can reduce the material cost of the flexible additive, and the polyether polyol described in this application can function better without affecting the electrical performance of the secondary battery.

Optionally, in preparing a positive electrode film layer with two sublayers, two positive electrode slurries containing different amounts of polyether polyol are first prepared, one slurry is applied on the current collector and dried, and then the other slurry is applied and dried.

In some embodiments, under the condition that flexibility of the positive electrode plate is measured using a winding mandrel, when a diameter R of the winding mandrel is less than or equal to 3.0 mm, the positive electrode plate has no cracks produced; or when a diameter R of the winding mandrel is equal to 3.0 mm, the positive electrode plate has cracks produced, but when the diameter R of the winding mandrel is equal to 4.0 mm, the positive electrode plate has no cracks produced.

In any embodiment, in measuring the flexibility of the positive electrode plate according to this application using a winding mandrel, an electrode plate sample of 50 mm width×100 mm length is prepared and then wound on a specially made winding mandrel. The cracking of the electrode plate is observed through both visual and microscopic inspection. The flexibility level is determined using the following method:

assuming the diameter of the winding mandrel to be R:

if the electrode plate has no cracks produced when $R \leq 3.0$ mm, determining the flexibility level to be flexibility level 1;

if the electrode plate has cracks produced when $R=3.0$ mm and has no cracks produced when $R=4.0$ mm, determining the flexibility level to be flexibility level 2;

if the electrode plate has no cracks produced when $R=4.0$ mm and has cracks produced when $R=5.0$ mm, determining the flexibility level to be flexibility level 3;

if the electrode plate has no cracks produced when $R=5.0$ mm and has cracks produced when $R=6.0$ mm, determining the flexibility level to be flexibility level 4; and if the electrode plate has no cracks produced when $R=6.0$ mm and has cracks produced when $R=7.0$ mm, determining the flexibility level to be flexibility level 5.

The winding mandrel is prepared as follows:

The 304 stainless steel bars with the conventional diameters of 3.0 mm, 4.0 mm, 5.0 mm, 6.0 mm, and 7.0 mm are cut to a length of 60 mm, and then welded to a 150 mm×300 mm steel plate to obtain the winding mandrels.

If the winding mandrel of a smaller diameter is used and the electrode plate does not crack, the electrode plate has better flexibility. Conversely, if the winding mandrel of a larger diameter is used and the electrode plate still cracks, the electrode plate has poorer flexibility.

In the cold pressing process, the hydrogen bonds formed are broken and the flexible main chains stretch. However, after the polyether polyol described in this application is added, the cold pressing pressure can be reduced, thereby reducing cracks and the risk of strip breakage.

In some embodiments, the positive electrode plate has an infiltration increase rate I ranging from 2% to 20%, and optionally from 6% to 15%, where $I=(I2-I1)/I1\times100\%$, I2 is an infiltration rate of the positive electrode plate in an electrolyte; and I1 is an infiltration rate of a positive electrode plate containing no polyether polyol in an electrolyte;

where the positive electrode plate used in the determination of I1 is the same as the positive electrode plate used in the determination of I2, differing only in that the positive electrode plate used in the determination of I1 contains no polyether polyol and the positive electrode plate used in the determination of I2 contains the polyether polyol.

The electrode plate with high infiltrability can realize good infiltration in the electrolyte and electrolyte retention, thus realizing effective infiltration into the electrode plate of the cell, avoiding inadequate infiltration into the electrode plate, improving the efficiency of electrolyte injection of the cell and the infiltration into the electrode plate during the cycling, and thus effectively improving the performance of battery products. The positive electrode plate described in this application has quite high infiltrability in the electrolyte.

A third aspect of this application provides a secondary battery including the positive electrode plate according to the second aspect of this application or a positive electrode plate obtained from the positive electrode slurry according to the first aspect of this application. The energy density of the secondary battery described in this application is significantly improved. In addition, the total material cost is reduced in the preparation of the battery.

The secondary battery, battery module, battery pack, and electric apparatus of this application are described below.

Secondary Battery

Normally, the secondary battery includes a positive electrode plate, a negative electrode plate, an electrolyte, and a separator. In a charge and discharge process of the battery, active ions are intercalated and deintercalated between the positive electrode plate and the negative electrode plate. The electrolyte conducts ions between the positive electrode plate and the negative electrode plate. The separator is disposed between the positive electrode plate and the negative electrode plate to mainly prevent a short circuit between positive and negative electrodes and to allow the ions to pass through.

[Positive Electrode Plate]

The positive electrode plate according to the second aspect of this application or a positive electrode plate prepared using the positive electrode slurry according to the first aspect of this application is used.

[Negative Electrode Plate]

The negative electrode plate includes a negative electrode current collector and a negative electrode film layer disposed on at least one surface of the negative electrode current collector, where the negative electrode film layer includes a negative electrode active material.

For example, the negative electrode current collector includes two opposite surfaces in its thickness direction, and the negative electrode film layer is disposed on either or both of the two opposite surfaces of the negative electrode current collector.

In some embodiments, the negative electrode current collector may be a metal foil current collector or a composite current collector. For example, the metal foil may be a copper foil. The composite current collector may include a polymer material matrix and a metal layer formed on at least one surface of the polymer material matrix. The composite current collector may be formed by forming a metal material (copper, copper alloy, nickel, nickel alloy, titanium, titanium alloy, silver, silver alloy, or the like) on a polymer material matrix (for example, matrices of polypropylene (PP), polyethylene terephthalate (PET), polybutylene terephthalate (PBT), polystyrene (PS), and polyethylene (PE)).

In some embodiments, the negative electrode active material may be a well-known negative electrode active material used for a battery in the art. For example, the negative electrode active substance may include at least one of the following materials: artificial graphite, natural graphite, soft carbon, hard carbon, a phosphorus-based material, a tin-based material, lithium titanate, or the like. The phosphorus-based material may be selected from at least one of elemental phosphorus, phosphorus oxide compound, phosphorus carbon compound, phosphorus nitrogen compound, and phosphorus alloy. The tin-based material may be selected from at least one of elemental tin, tin-oxygen compound, and tin alloy. However, this application is not limited to these materials, but may use other conventional materials that can be used as negative electrode active materials for batteries instead. One of these negative electrode active materials may be used alone, or two or more of them may be used in combination.

In some embodiments, the negative electrode film layer further optionally includes a binder. The binder may be selected from at least one of styrene-butadiene rubber (SBR), polyacrylic acid (PAA), polyacrylic acid sodium (PAAS), polyacrylamide (PAM), polyvinyl alcohol (PVA), sodium alginate (SA), polymethacrylic acid (PMAA), and carboxymethyl chitosan (CMCS).

In some embodiments, the negative-electrode film layer further optionally includes a conductive agent. The conductive agent may be selected from at least one of superconducting carbon, acetylene black, carbon black, Ketjen black, carbon dots, carbon nanotubes, graphene, and carbon nanofiber.

In some embodiments, the negative electrode film layer further optionally includes other promoters such as a thickener (for example, sodium carboxymethyl cellulose (CMC-Na)).

In some embodiments, the negative electrode plate may be prepared in the following manner: the foregoing constituents used for preparing the negative electrode plate, for example, the negative electrode active substance, the conductive agent, the binder, and any other constituent, are dispersed in a solvent (for example, deionized water) to form a negative electrode slurry; and the negative electrode slurry is applied onto the negative electrode current collector, followed by processes such as drying and cold pressing to obtain the negative electrode plate.

[Electrolyte]

The electrolyte conducts ions between the positive electrode plate and the negative electrode plate. The electrolyte is not specifically limited to any particular type in this application, and may be selected based on needs. For example, the electrolyte may be selected from at least one of a solid electrolyte and a liquid electrolyte (that is, an electrolyte).

In some embodiments, the electrolyte is a liquid electrolyte. The liquid electrolyte includes an electrolytic salt and a solvent.

In some embodiments, the electrolytic salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), and lithium tetrafluoro oxalato phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the electrolyte further optionally includes an additive. For example, the additive may include a negative electrode film-forming additive, or may include a positive electrode film-forming additive, or may include an additive capable of improving some performance of the battery, for example, an additive for improving overcharge performance of the battery, an additive for improving high-temperature performance of the battery, or an additive for improving low-temperature performance of the battery.

[Separator]

In some embodiments, the secondary battery further includes a separator. The separator is disposed between the positive electrode plate and the negative electrode plate to provide separation. The separator is not limited to any particular type in this application, and may be any well-known porous separator with good chemical stability and mechanical stability.

In some embodiments, a material of the separator may be selected from at least one of glass fiber, non-woven fabric, polyethylene, polypropylene, and polyvinylidene fluoride. The separator may be a single-layer film or a multi-layer composite film, and is not particularly limited. When the separator is a multi-layer composite film, all layers may be made of same or different materials, which is not particularly limited.

[Outer Package]

In some embodiments, the secondary battery may include an outer package for packaging the positive electrode plate, the negative electrode plate, and the electrolyte. In an example, the positive electrode plate, the negative electrode plate, and the separator may be laminated or wound to form a battery cell of a laminated structure or a battery cell of a wound structure, and the battery cell is packaged in an outer package. The electrolyte may be a liquid electrolyte, and the liquid electrolyte infiltrates into the battery cell. There may be one or more battery cells in the secondary battery, and the quantity can be adjusted based on needs.

In an embodiment, this application provides an electrode assembly. In some embodiments, the positive electrode plate, the negative electrode plate, and the separator may be made into an electrode assembly through winding or lamination. The outer package may be used for packaging the foregoing electrode assembly and electrolyte.

In some embodiments, the outer package of the secondary battery may be a soft pack, for example, a soft pouch. A material of the soft pack may be plastic, for example, may include one or more of polypropylene (PP), polybutylene terephthalate (PBT), polybutylene succinate (PBS), and the like. In some embodiments, the outer package of the secondary battery may be a hard shell, for example, a hard plastic shell, an aluminum shell, or a steel shell.

Preparation Method of Secondary Battery

In an embodiment, this application provides a preparation method of secondary battery, where the negative electrode plate according to this application or a negative electrode plate prepared according to the method of this application is used.

The preparation of the secondary battery may further include the step of assembling the negative electrode plate, positive electrode plate, and electrolyte of this application to form the secondary battery. In some embodiments, the positive electrode plate, the separator, and the negative electrode may be wound or laminated in sequence such that the separator is located between the positive electrode plate and the negative electrode plate for separation to obtain a battery cell. The battery cell is placed into an outer package, the liquid electrolyte is injected, and the package is then sealed, so as to obtain a secondary battery.

In some embodiments, the preparation of the secondary battery may further include the step of preparing a positive electrode plate. In an example, a positive electrode active substance, a conductive agent, and a binder may be dispersed in a solvent (for example, N-methylpyrrolidone, NMP for short) to form a uniform positive electrode slurry, and the positive electrode slurry is applied on a positive electrode current collector, and processes such as drying and cold pressing are performed to obtain a positive electrode plate.

In some embodiments, the preparation of the secondary battery includes the step of preparing a negative electrode plate according to the method of this application.

This application does not impose any special limitations on a shape of the secondary battery, and the secondary battery may be cylindrical, rectangular, or of any other shapes.

In some embodiments, this application provides an electric apparatus, a battery module, or a battery pack, where the electric apparatus, battery module, or battery pack includes the secondary battery according to this application or a secondary battery prepared according to the method of this application.

In some embodiments, the secondary battery may be assembled into a battery module, and the battery module may include one or more secondary batteries. The specific quantity may be chosen by persons skilled in the art according to use and capacity of the battery module.

In some embodiments, the battery module may be further assembled into a battery pack, and the battery pack may include one or more battery modules. The specific quantity may be chosen by persons skilled in the art according to use and capacity of the battery pack.

In addition, this application further provides an electric apparatus. The electric apparatus includes at least one of the secondary battery, the battery module, or the battery pack provided in this application. The secondary battery, the battery module, or the battery pack may be used as a power source for the electric apparatus or an energy storage unit of the electric apparatus. The electric apparatus may include a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite system, an energy storage system, or the like, but is not limited thereto. In another example, the apparatus may be a mobile phone, a tablet computer, a notebook computer, or the like. The apparatus usually requires to be light and thin, and a secondary battery may be used as a power source. The secondary battery, the battery module, or the battery pack may be selected for the electric apparatus based on requirements for using the electric apparatus.

Therefore, this application provides a battery module including the secondary battery according to this application.

In addition, this application further provides a battery pack including the foregoing battery module.

This application further provides an electric apparatus including at least one of the secondary battery, the battery module, or the battery pack according to this application.

EXAMPLES

The following describes examples of this application. The examples described below are illustrative and only used for explaining this application, and cannot be construed as limitations on this application. Examples whose technical solutions or conditions are not specified are made in accordance with technical solutions or conditions described in literature in the field or made in accordance with product instructions. The reagents or instruments used are all conventional products that are commercially available if no manufacturer is indicated.

Example 1

Step 1: Preparation of Polyether Polyol 25 g of sodium hydroxide as a catalyst, 18 g of glycerol as a regulator, 1000 g of sorbitol as an initiator, and 5000 g of propylene oxide were added into an autoclave for reacting at 100° C. for 10 h under a pressure of 0.15 MPa to obtain crude polyether polyol. The crude polyether polyol was neutralized, degassed, adsorbed, and vacuum filtered to obtain finished polyether polyol with a weight-average molecular weight of 40,000. The weight-average molecular weight was measured by gel permeation chromatography.

Step 2: Preparation of Positive Electrode Slurry 6279 g of a positive electrode active substance (lithium iron phosphate), 65 g of a conductive agent (conductive carbon black Super P), and 130 g of a binder PVDF (see Table 2 for specific amount) were mixed for 30 min. Then, the resulting mixture was added to 3500 g of NMP and stirred for 180 min for uniform dispersion. Finally, the resulting mixture was added with 26 g of polyether polyol prepared in step 1 and then fully stirred for 60 min to form a uniform positive electrode slurry.

Step 3: Preparation of Positive Electrode Plate

The positive electrode slurry prepared in step 2 was applied onto two surfaces of the positive electrode current collector aluminum foil, followed by drying and cold pressing to obtain the positive electrode plate. A series of performance tests were performed on the positive electrode plate with a maximum coating weight per unit area of 31 $mg/cm^2$.

During the performance test process of the positive electrode plate, the maximum coating weight per unit area was determined as follows:

(1) testing whether cracking occurs in the coating process of the electrode plate, and if no cracking occurs, continuing with the next test;

(2) testing whether breakage occurs during cold pressing, and if no breakage occurs, continuing with the flexibility test; and (3) performing the flexibility test of the positive electrode plate described in this application, where a maximum coating weight corresponding to a test result of below flexibility level 2 with no cracking during coating and no breakage after cold pressing is the maximum coating weight described in the examples of this application.

Step 4: Preparation of Negative Electrode Plate

A negative electrode active material (graphite), a conductive agent (Super-P), a binder (SBR), and a thickener (CMC) were mixed and fully stirred at a mass ratio of 96.2:0.8:1.8:1.2 in an appropriate amount of deionized water to form a uniform negative electrode slurry. The negative electrode slurry was applied onto two surfaces of a current collector copper foil, followed by drying and cold pressing, to obtain the negative electrode plate.

Step 5: Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L.

Step 6: Separator

The separator was a polyethylene (PE) film.

Step 7: Preparation of Secondary Battery

The foregoing positive electrode plate, separator, and negative electrode plate were stacked in sequence and wound to obtain an electrode assembly. The electrode assembly was placed in an outer package, the foregoing electrolyte was added, and steps such as packaging, standing, formation, and aging were performed to obtain the secondary battery of Example 1. A hard shell with length x width x height being 148 mm×28.5 mm×97.5 mm was chosen as the outer package.

Examples 2 to 8

The secondary batteries of Examples 2 to 8 were prepared in a manner similar to that of Example 1, with the difference lying in the reacting time of polyether polyol in step 1. See Table 1 for details.

Examples 9 and 10

The secondary batteries of Examples 9 and 10 were prepared in a manner similar to that of Example 1, with the difference lying in that propylene glycol and glycerol are used as initiators during the preparation of polyether polyol in step 1. See Table 1 for details.

Comparative Example 1

The secondary battery of Comparative Example 1 was prepared in a manner similar to that of Example 1, with the difference lying in that no polyether polyol was added, in other words, there was no step 1 and no polyether polyol was added in step 2.

TABLE 1

| Preparation of polyether polyol | | | | |
|---|---|---|---|---|
| Preparation example | Initiator/ Amount (g) | Amount of propylene oxide (g) | Amount of NaOH catalyst (g) | Reacting time (h) |
| Example 1 | Sorbitol/1000 | 5000 | 25.0 | 10 |
| Example 2 | Sorbitol/1000 | 5000 | 25.0 | 1 |
| Example 3 | Sorbitol/1000 | 5000 | 25.0 | 3 |
| Example 4 | Sorbitol/1000 | 5000 | 25.0 | 14 |
| Example 5 | Sorbitol/1000 | 5000 | 25.0 | 17 |
| Example 6 | Sorbitol/1000 | 5000 | 25.0 | 20 |
| Example 7 | Sorbitol/1000 | 5000 | 25.0 | 0.5 |
| Example 8 | Sorbitol/1000 | 5000 | 25.0 | 25 |
| Example 9 | 1,3-propanediol/1000 | 4000 | 20.0 | 10 |
| Example 10 | Glycerol/1000 | 3300 | 16.5 | 10 |

Examples 11 to 17

The secondary batteries of Examples 11 to 17 were prepared in a manner similar to that of Example 1, with the difference lying in the amount of positive electrode active material lithium iron phosphate and the amount of polyether polyol in step 2. See Table 2 for details.

TABLE 2

| Substances used in preparation of positive electrode slurry and amount thereof | | | |
|---|---|---|---|
| Preparation example | Positive electrode active material | Amount (g) | Amount of polyether polyol (g) |
| Example 1 | Lithium iron phosphate | 6279.00 | 26.00 |
| Example 11 | Lithium iron phosphate | 6301.75 | 3.25 |
| Example 12 | Lithium iron phosphate | 6110.00 | 195.00 |
| Example 13 | Lithium iron phosphate | 6298.50 | 6.50 |
| Example 14 | Lithium iron phosphate | 6175.00 | 130.00 |
| Example 15 | Lithium iron phosphate | 6259.50 | 45.50 |
| Example 16 | Lithium iron phosphate | 6292.00 | 1.30 |
| Example 17 | Lithium iron phosphate | 6272.50 | 325.0 |

Test for Slurry Parameters

1. Gel State Factor of Positive Electrode Slurry

The gel state of the positive electrode slurry was evaluated using the following method.

The gel state factor of the positive electrode slurry was denoted by G, G=|(m2−m1)/m1, where m1 is a mass of a positive electrode slurry obtained after 2 kg of an initial positive electrode slurry is filtered for 10 minutes using a 200-mesh filter; and m2 is a mass of a positive electrode slurry obtained after 2 kg of a positive electrode slurry that has been left standing for 48 hours is filtered for 10 minutes using a 200-mesh filter; where the positive electrode slurry used in the determination of m1 and the positive electrode slurry used in the determination of m2 are from the same batch of positive electrode slurry.

If G ranged from 0 to 0.3, the slurry was determined to be not gelled; and G>0.3, the slurry was determined to be gelled.

Test for Parameters of Positive Electrode Plate

1. Test for Flexibility of Positive Electrode Plate

The flexibility of the positive electrode plate was evaluated using a winding mandrel, and the test method was as follows:

An electrode plate sample with width x length being 50 mm×100 mm was prepared and then wound on a specially made winding mandrel. The cracking of the electrode plate was observed through both visual and microscopic inspection.

Figure 5:
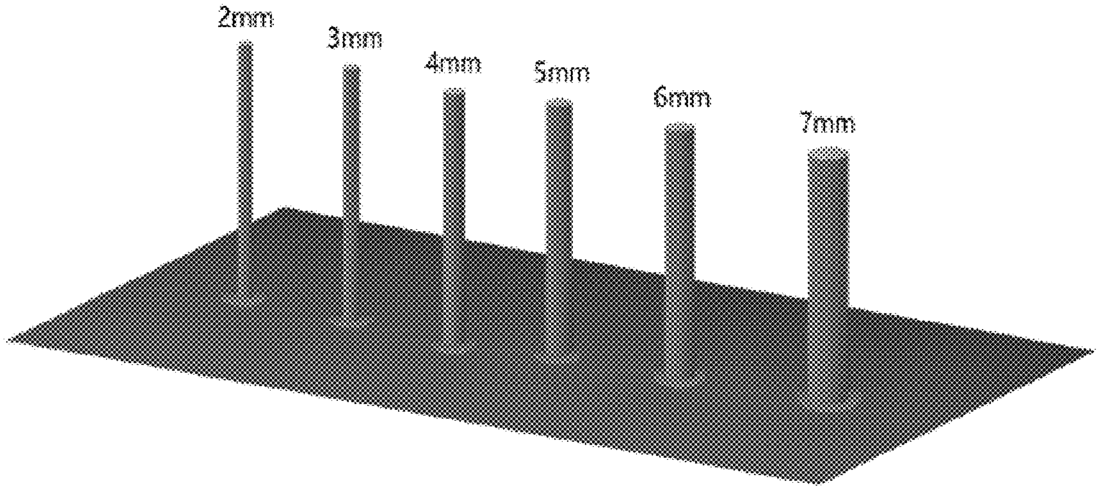
FIG. 5 is a schematic diagram of a winding mandrel used in flexibility test of a positive electrode plate of this application.

Specially Made Winding Mandrel:

The 304 stainless steel bars with the conventional diameters of 3.0 mm, 4.0 mm, 5.0 mm, 6.0 mm, and 7.0 mm were cut to a length of 60 mm, and then fastened on a 150 mm×300 mm steel plate, as shown in FIG. 5.

The flexibility level was determined using the following method:

assuming the diameter of the winding mandrel to be R:

if the electrode plate has no cracks produced when R≤3.0 mm, determining the flexibility level to be flexibility level 1;

if the electrode plate has cracks produced when R=3.0 mm and has no cracks produced when R=4.0 mm, determining the flexibility level to be flexibility level 2;

if the electrode plate has no cracks produced when R=4.0 mm and has cracks produced when R=5.0 mm, determining the flexibility level to be flexibility level 3;

if the electrode plate has no cracks produced when R=5.0 mm and has cracks produced when R=6.0 mm, determining the flexibility level to be flexibility level 4; and if the electrode plate has no cracks produced when R=6.0 mm and has cracks produced when R=7.0 mm, determining the flexibility level to be flexibility level 5.

2. Infiltration Increase Rate of Positive Electrode Plate

The infiltration increase rate of the positive electrode plate is denoted by I, and I=(I2−I1)/I1×100% where

I2 is an infiltration rate of the positive electrode plate in an electrolyte; and I1 is an infiltration rate of a positive electrode plate containing no polyether polyol in an electrolyte;

where the positive electrode plate used in the determination of I1 was the same as the positive electrode plate used in the determination of I2, differing only in that the positive electrode plate used in the determination of I1 contained no polyether polyol and the positive electrode plate used in the determination of I2 contained the polyether polyol.

The procedures for the determination of I1 and I2 were as follows:

The absorption rate of the electrode plate was tested by using the capillary method. An electrode plate of a size greater than or equal to 50 mm×50 mm was prepared, with flat surfaces without any fold, film peeling, or powder falling; a capillary tube with an inner diameter d of 100 um was chosen and then polished with sandpaper until the opening was smooth; the capillary tube was used to suction up the electrolyte until h was equal to 5 mm, that is, the electrolyte height was controlled to be 5 mm; the capillary tube was put under the microscope such that it was in contact with the electrode plate; a stopwatch was started for time counting when the electrolyte level of the capillary tube started to drop; and after the electrolyte level had dropped to zero, the absorption time t was read and recorded. Then the infiltration rate of the electrolyte was calculated from $\pi\times(d/2)^2\times h\times\rho/t$, where $\pi$ is 3.14 and $\rho$ is the density of the electrolyte.

3. Measurement of Coating Weight per Unit Area

An uncoated aluminum foil and the positive electrode plate that had been dried in the coating process (where in the positive electrode plate, the positive electrode current collector has a coating on both sides) were prepared, with each punched into 15 small discs with an area of 1540.25 $mm^2$. The average mass of the small uncoated aluminum foil discs was subtracted from the average mass of the small electrode plate discs and then the difference obtained was divided by 2 to obtain the coating weight per unit area.

The term “single surface” refers to coating on only one surface of the current collector, and is a concept different from the number of “sublayers” described earlier in this application. The maximum coating weight per unit area in the table refers to the coating weight on a single surface.

The coating weights of the examples in the table of this application are data of maximum coating weight per unit area on a single surface, and the performance of the electrode plate and the performance of the battery are both measured at the maximum coating weight.

As described above, the maximum coating weight per unit area is the maximum coating weight obtained through the following test:

(1) testing whether cracking occurs in the coating process of the electrode plate, and if no cracking occurs, continuing with the next test;

(2) testing whether breakage occurs during cold pressing, and if no breakage occurs, continuing with the flexibility test; and (3) performing the flexibility test of the positive electrode plate described in this application, where a maximum coating weight corresponding to a test result of below flexibility level 2 with no cracking during coating and no breakage after cold pressing is the maximum coating weight described in the examples of this application.

Battery-Related Performance Test

1. Energy Density Test

The battery prepared in each example and comparative example was weighed to obtain the mass of the entire battery; the battery was subjected to capacity formation, left standing for 10 min at 25° C., and charged to 100% SOC at 0.33C, and then the battery was subjected to low current depolarization, left standing for 10 min, and discharged to 0% SOC at 0.33. The capacity obtained at this point was the 0.33C capacity of the battery. The battery was left standing for 30 min, charged to 100% SOC, left standing for 30 min, and then discharged at a constant current of 0.01C for 30 min. The voltage remained constant for some time, and this constant value was the charge-discharge plateau, namely, a plateau voltage. Finally, the mass energy density of the battery was calculated: battery mass energy density=battery capacity xdischarge plateau voltage/weight of entire battery, in Wh/kg (Watt-hour/kg).

2. Determination of Direct Current Resistance (Direct Current Resistance, DCR for Short)

The capacity test for the battery prepared in each example was carried out at 25° C. The capacity test method was as described above. The battery was charged at a constant voltage of 0.05C, left standing for 60 min, discharged at 0.33C to 50% SOC, left standing for 60 min, discharged at 0.33C to 20% SOC, left standing for 60 min, and discharged at 0.33C to 0% SOC. The open circuit voltage was tested at 0% SOC, and the DCR data in 30 s was calculated.

See Tables 3 to 5 for test results. “/” in the table means that a corresponding item is not present, not added, or not measured.

TABLE 3

| Comparison of cases with polyether polyol added and with no polyether polyol added | | | |
|---|---|---|---|
| | No. | Example 1 | Comparative Example 1 |
| Polyether polyol | Weight-average molecular weight | 40000 | / |
| Positive electrode slurry | Weight ratio of polyether polyol to positive electrode active substance | 0.004 | / |
| | Gel state factor G | 0.1 | 0.6 |
| Positive electrode plate | Diameter of winding mandrel (R/mm) | ≤3 | 6 |
| | Maximum coating weight per unit area ($mg/cm^2$) | 31 | 22 |
| | Infiltration increase rate I | 15% | / |
| Battery performance | Energy density (Wh/kg) | 197 | 187 |
| | DCR (mΩ) | 2 | 3 |

It can be seen from Table 3 that compared with Comparative Example 1 in which no polyether polyol is added, the positive electrode slurry added with polyether polyol in Example 1 has a 41% increase in coating weight per unit area and a 5% increase in energy density, that is, the battery performance has been significantly improved.

TABLE 4

Analysis of molecular weights

| | | Example No. | | | | | | | | | |
|---|---|---|---|---|---|---|---|---|---|---|---|
| | | Example 1 | Example 2 | Example 3 | Example 4 | Example 5 | Example 6 | Example 7 | Example 8 | Example 9 | Example 10 |
| Polyether polyol | Weight-average molecular weight | 40000 | 2000 | 4000 | 60000 | 70000 | 80000 | 500 | 90000 | 40000 | 40000 |
| Positive electrode slurry | Weight ratio of polyether polyol to positive electrode active substance | 0.004 | 0.004 | 0.004 | 0.004 | 0.004 | 0.004 | 0.004 | 0.004 | 0.004 | 0.004 |
| | Gel state factor G | 0.1 | 0.1 | 0.1 | 0.2 | 0.3 | 0.3 | 0.6 | 1 | 0.15 | 0.1 |
| Positive electrode plate | Diameter of winding mandrel (R/mm) | ≤3 | ≤4 | ≤3 | ≤3 | ≤3 | ≤3 | 7 | ≤3 | ≤3 | ≤3 |
| | Maximum coating weight per unit area ($mg/cm^2$) | 31 | 28 | 28 | 28 | 30 | 30 | 22 | 29 | 30 | 31 |
| | Infiltration increase rate I | 15% | 6% | 6% | 12% | 13% | 14% | 2% | 10% | 14% | 12% |
| Battery performance | Energy density (Wh/kg) | 197 | 193 | 193 | 193 | 196 | 196 | 187 | 195 | 196 | 197 |
| | DCR (mΩ) | 2 | 2.2 | 2.3 | 3.2 | 4.0 | 4.5 | 3.1 | 10 | 2.1 | 2.3 |

It can be seen from Table 4 that the molecular weight of the polyether polyol affects the coating weight per unit area and energy density of the battery. When the molecular weight is too small, the positive electrode slurry has poor stability, physical gelation is likely to occur, the flexibility of the positive electrode plate is not significantly improved, and cracking still occurs in the coating process. When the molecular weight is too large, there are many non-conducting polymers in the slurry, and consequently cross-linking is likely to occur during polymerization, resulting in gelation of the slurry, which affects the sheet resistance of the electrode plate.

TABLE 5

Analysis of weight ratios of polyether polyol

| | | No. | | | | | | | |
|---|---|---|---|---|---|---|---|---|---|
| | | Example 1 | Example 11 | Example 12 | Example 13 | Example 14 | Example 15 | Example 16 | Example 17 |
| Polyether polyol | Weight-average molecular weight | 40000 | 40000 | 40000 | 40000 | 40000 | 40000 | 40000 | 40000 |
| Positive electrode slurry | Weight ratio of polyether polyol to positive electrode active substance | 0.004 | 0.0005 | 0.03 | 0.001 | 0.02 | 0.007 | 0.0002 | 0.05 |
| | Gel state factor G | 0.1 | 0.3 | 0.3 | 0.15 | 0.2 | 0.15 | 0.7 | 1 |
| Positive electrode plate | Diameter of winding mandrel (R/mm) | ≤3 | 3 | ≤3 | ≤3 | ≤3 | ≤3 | 6 | 3 |
| | Maximum coating weight per unit area ($mg/cm^2$) | 31 | 28 | 31 | 30 | 31 | 31 | 22 | 31 |
| | Infiltration increase rate I | 15% | 7% | 14% | 14% | 14% | 15% | 2% | 10% |
| Battery performance | Energy density (Wh/kg) | 197 | 193 | 197 | 196 | 197 | 197 | 187 | 197 |
| | DCR (mΩ) | 2 | 3 | 5.2 | 2.6 | 4.1 | 2.5 | 2.4 | 9.8 |

It can be seen from Table 5 that the weight ratio of the polyether polyol to the positive electrode active substance affects the coating weight per unit area of the electrode plate. When the weight ratio of the polyether polyol to the positive electrode active substance is <0.0005, the positive electrode plate cracks at a high coating weight, and the corresponding battery has a low energy density. When the weight ratio of the polyether polyol to the positive electrode active substance is >0.03, the sheet resistance of the electrode plate deteriorates, and the DCR of the battery is high, which greatly affect the rate performance of the battery.

It should be noted that this application is not limited to the foregoing embodiments. The foregoing embodiments are merely examples, and embodiments having substantially the same constructions and the same effects as the technical idea within the scope of the technical solutions of this application are all included in the technical scope of this application. In addition, without departing from the essence of this application, various modifications made to the embodiments that can be conceived by persons skilled in the art, and other manners constructed by combining some of the constituent elements in the embodiments are also included in the scope of this application.

The invention claimed is:

1. A positive electrode slurry, comprising a positive electrode active substance and polyether polyol, wherein the polyether polyol has the formula:

formula 1

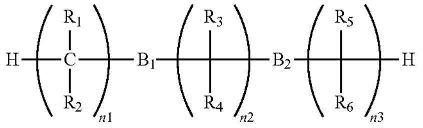

wherein n1, n2, and n3 are all integers, with a sum in the range of 1 to 10;

$B_1$ and $B_2$ are each independently selected from a straight bond and $-(CH_2)_{n4}-$, wherein n4 is an integer, and a sum of n4 and n1, n2, and n3 is in the range of 1 to 10;

$R_1$, $R_2$, $R_3$, $R_4$, $R_5$, and $R_6$ are each independently selected from H, hydroxyl, halogen, a $C_{2-10}$ alkyl group, a $C_{2-10}$ alkoxy group, and XM, wherein X is selected from —O—, —S—, and —NH—;

M has the formula:

formula 2

$$-(CH_2-CHR-O)_nD$$

wherein n is an integer ranging from 2 to 2000; and

D is H or a $C_{1-8}$ alkyl group;

R is selected from H, halogen, hydroxyl, a halogenated $C_{1-8}$ alkyl group, $-R_7$, $-OR_7$, or $R_7OR_8$, wherein $R_7$ and $R_8$ are each independently selected from a straight-chain or branched-chain $C_{1-8}$ alkyl group, a phenyl group, a $C_{1-8}$ alkyl substituted phenyl group, a $C_{1-8}$ alkoxy substituted phenyl group, or a halogenated phenyl group; and at least one of $R_1$, $R_2$, $R_3$, $R_4$, $R_5$, and $R_6$ is XM.

2. The positive electrode slurry according to claim 1, wherein the sum of n1, n2, n3, and n4 is in the range of 2 to 6.

3. The positive electrode slurry according to claim 1, wherein the polyether polyol has a weight-average molecular weight ranging from 1000 to 80,000.

4. The positive electrode slurry according to claim 1, wherein a weight ratio of the polyether polyol to the positive electrode active substance ranges from 0.0005 to 0.050.

5. The positive electrode slurry according to claim 1, wherein the positive electrode active substance is selected from at least one of lithium iron phosphate, lithium manganese iron phosphate, lithium manganese oxide, lithium cobalt oxide, lithium nickel cobalt manganese oxide, lithium nickel cobalt aluminate, lithium nickel oxide, or a mixture thereof.

6. The positive electrode slurry according to claim 1, wherein a gel state factor G of the positive electrode slurry ranges from 0 to 1;

wherein G=(m1−m2)/m1, the slurry is determined to be not gelled when G ranges from 0 to 0.3, and the slurry is determined to be gelled when G is greater than 0.3;

m1 is a mass of a positive electrode slurry obtained after 2 kg of an initial positive electrode slurry is filtered for 10 minutes using a 100-mesh filter; and m2 is a mass of a positive electrode slurry obtained after 2 kg of a positive electrode slurry that has been left standing for 48 hours is filtered for 10 minutes using a 100-mesh filter; wherein the positive electrode slurry used in the determination of ml and the positive electrode slurry used in the determination of m2 are from the same batch of positive electrode slurry.

7. A secondary battery, comprising a positive electrode plate obtained from the positive electrode slurry according to claim 1.

8. The positive electrode slurry according to claim 1, where in X is —O—.

9. The positive electrode slurry according to claim 1, wherein n is an integer from 10 to 2000, the polyether polyol has a weight-average molecular weight ranging from 2000 to 70,000, the weight ratio of the polyether polyol to the positive electrode active substance ranges from 0.001 to 0.02, and the gel state factor G of the positive electrode slurry ranges from 0 to 0.3.

10. The positive electrode slurry according to claim 9, wherein n is an integer from 20 to 1500, the polyether polyol has a weight-average molecular weight ranging more from 4000 to 60,000, and the weight ratio of the polyether polyol to the positive electrode active substance ranges from 0.001 to 0.01.

11. The positive electrode slurry according to claim 9, wherein the weight ratio of the polyether polyol to the positive electrode active substance ranges from 0.001 to 0.007.

12. A positive electrode plate, comprising:

a positive electrode current collector; and a positive electrode film layer on at least one surface of the positive electrode current collector, wherein the positive electrode film layer is prepared from the positive electrode slurry according to claim 1, a mass of the positive electrode film layer per unit area of the electrode plate ranges from 13 $mg/cm^2$ to 42 $mg/cm^2$, and the mass is a mass of the positive electrode film layer on a single surface of the electrode plate.

13. The positive electrode plate according to claim 12, wherein under the condition that flexibility of the positive electrode plate is measured using a winding mandrel, when a diameter R of the winding mandrel is less than or equal to 3.0 mm, the positive electrode plate has no cracks produced; or when a diameter R of the winding mandrel is equal to 3.0 mm, the positive electrode plate has cracks produced, but when the diameter R of the winding mandrel is equal to 4.0 mm, the positive electrode plate has no cracks produced.

14. The positive electrode plate according to claim 12, wherein the positive electrode plate has an infiltration increase rate I ranging from 2% to 20% wherein I=(I2−I1)/I1×100%;

I2 is an infiltration rate of the positive electrode plate in an electrolyte; and I1 is an infiltration rate of a positive electrode plate containing no polyether polyol in an electrolyte;

wherein the positive electrode plate used in the determination of I1 is the same as the positive electrode plate used in the determination of I2, differing only in that the positive electrode plate used in the determination of I1 contains no polyether polyol and the positive electrode plate used in the determination of I2 contains the polyether polyol.

15. A secondary battery, comprising the positive electrode plate according to claim 12.

16. The positive electrode plate of claim 12, wherein the mass of the positive electrode film layer per unit area of the electrode plate ranges from 22 $mg/cm^2$ to 31 $mg/cm^2$, and the mass is a mass of the positive electrode film layer on a single surface of the electrode plate, and the positive electrode plate has an infiltration increase rate I ranging from 2% to 20%.

17. The positive electrode plate of claim 16, wherein the mass of the positive electrode film layer per unit area of the electrode plate ranges from 22 $mg/cm^2$ to 29 $mg/cm^2$, and the mass is a mass of the positive electrode film layer on a single surface of the electrode plate, wherein the positive electrode plate has an infiltration increase rate I ranging from 6% to 15%.

18. The positive electrode plate of claim 17, wherein the mass of the positive electrode film layer per unit area of the electrode plate ranges from 25 $mg/cm^2$ to 29 $mg/cm^2$.

* * * * *